United States Patent
Zhamu et al.

(10) Patent No.: US 9,437,344 B2
(45) Date of Patent: Sep. 6, 2016

(54) GRAPHITE OR CARBON PARTICULATES FOR THE LITHIUM ION BATTERY ANODE

(75) Inventors: Aruna Zhamu, Centerville, OH (US); Jinjun Shi, Hilliard, OH (US); Guorong Chen, Fairborn, OH (US); Qing Fang, Fairborn, OH (US); Bor Z. Jang, Centerville, OH (US); Ming C. Wang, Fairborn, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 738 days.

(21) Appl. No.: 12/804,413

(22) Filed: Jul. 22, 2010

(65) Prior Publication Data

US 2012/0021294 A1    Jan. 26, 2012

(51) Int. Cl.
| | |
|---|---|
| *B32B 9/00* | (2006.01) |
| *H01B 1/12* | (2006.01) |
| *C01B 31/04* | (2006.01) |
| *H01M 4/133* | (2010.01) |
| *H01M 4/587* | (2010.01) |
| *H01M 10/0525* | (2010.01) |

(52) U.S. Cl.
CPC .............. *H01B 1/122* (2013.01); *C01B 31/04* (2013.01); *H01M 4/133* (2013.01); *H01M 4/587* (2013.01); *H01M 10/0525* (2013.01); *Y02E 60/122* (2013.01); *Y02T 10/7011* (2013.01); *Y10T 428/30* (2015.01)

(58) Field of Classification Search
CPC .......................... C01B 31/04; Y10T 428/408
USPC ............. 428/408; 423/448, 447.1; 429/231.8
See application file for complete search history.

(56) References Cited

U.S. PATENT DOCUMENTS

| | | | |
|---|---|---|---|
| 6,344,296 B1 | 2/2002 | Ishii et al. | |
| 6,444,365 B2 | 9/2002 | Ishii et al. | |
| 6,447,956 B2 | 9/2002 | Ishii et al. | |
| 6,953,640 B2 | 10/2005 | Ishii et al. | |
| 7,410,727 B2 | 8/2008 | Ishii et al. | |
| 2004/0023115 A1* | 2/2004 | Kato et al. | ................. 429/231.8 |
| 2008/0274404 A1* | 11/2008 | Ishii et al. | ..................... 429/217 |
| 2009/0117467 A1* | 5/2009 | Zhamu et al. | ............. 429/231.8 |
| 2011/0183180 A1* | 7/2011 | Yu et al. | ........................ 429/128 |

* cited by examiner

*Primary Examiner* — Daniel H Miller

(57) ABSTRACT

This invention provides a graphite or graphite-carbon particulate for use as a lithium secondary battery anode material having a high-rate capability. The particulate is formed of a core carbon or graphite particle and a plurality of satellite carbon or graphite particles that are each separately bonded to the core particle wherein the core particle is spherical in shape, slightly elongate in shape with a major axis-to-minor axis ratio less than 2, or fibril in shape, and wherein the satellite particles are disc-, platelet-, or flake-like particles each containing a graphite crystallite with a crystallographic c-axis dimension Lc and a lateral dimension. Preferably, Lc is less than 100 nm and the flake/platelet lateral dimension is less than 1 μm. The core particle may be selected from natural graphite, artificial graphite, spherical graphite, graphitic coke, meso-carbon micro-bead, soft carbon, hard carbon, graphitic fibril, carbon nano-fiber, carbon fiber, or graphite fiber. Preferably, the flat-shaped particles are randomly oriented with respect to one another.

30 Claims, 12 Drawing Sheets

GRAPHITE OR CARBON PARTICULATES FOR THE LITHIUM ION BATTERY ANODE

This invention is based on the research result of a US National Science Foundation Small Business Innovation Research (NSF-SBIR) project. The US government has certain rights on this invention.

FIELD OF THE INVENTION

The present invention provides a carbonaceous material (carbon or graphite) for use as an anode active material in a secondary battery, particularly lithium-ion battery. In particular, this invention relates to a novel graphite/carbon particulate, a process for producing the same, a paste using the graphite/carbon particulate, a negative electrode for lithium secondary battery using the graphite/carbon particulate paste, a process for producing the negative electrode, and a lithium secondary battery. More particularly, this invention provides a lithium secondary battery suitable for use in electric cars and power tools that demand high rate capability of the anode and the cathode. The invented anode graphite-carbon composition exhibits a high capacity even under a high charge/discharge condition and a good cycle stability.

BACKGROUND

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. Carbon anodes can have a long cycle life due to the presence of a protective solid-electrolyte interface layer (SEI), which results from the reaction between lithium and the electrolyte during the first several cycles of charge-discharge. The lithium in this reaction comes from some of the lithium ions originally intended for the charge transfer purpose. As the SEI is formed, the lithium ions become part of the inert SEI layer and become irreversible, i.e, these lithium atoms can no longer be shuttled between the anode and the cathode. Therefore, it is desirable to use a minimum amount of lithium for the formation of an effective SEI layer. In addition to SEI formation, $Q_{ir}$ has been attributed to graphite exfoliation caused by electrolyte solvent co-intercalation and other side reactions.

The maximum amount of lithium that can be reversibly intercalated into the interstices between graphene planes of a theoretically perfect graphite crystal is generally believed to occur in a graphite intercalation compound represented by $Li_xC_6$ (x=1), corresponding to a theoretical specific capacity of 372 mAh/g. In other "graphitized carbon materials" than pure graphite crystals, there exists a certain amount of amorphous or disordered carbon phase and a significant amount of graphite crystallites dispersed in the disordered phase. Each crystallite is typically composed of a number of graphene sheets (basal planes) that are stacked and bonded together by weak van der Waals forces along the crystallographic c-axis direction. The number of graphene sheets varies between just a few and several hundreds, giving rise to a c-directional dimension (thickness Lc) of typically a few nanometers to several hundreds of nanometers (nm). The length or width (La) of these crystallites is typically between tens of nanometers to microns.

The amorphous or disordered phase is a source of irreversible capacity loss since lithium stored in this phase tends to stay therein and does not come out during the subsequent discharge cycle, resulting in a significant drop of reversible capacity. Furthermore, an amorphous carbon phase tends to exhibit a low electrical conductivity (high charge transfer resistance) and, hence, a high polarization or internal power loss. Generally speaking, the amount of amorphous phase should be as small as possible in order to minimize the degree of irreversibility.

These "graphitized carbon materials" include natural flake graphite, synthetic graphite, hard carbon, soft carbon, meso-phase micro beads (MCMBs), micron-scaled carbon or graphite fibers (typically having a diameter in the range of 6-12 μm), and vapor-grown carbon nano-fibers (VG-CNFs) having a diameter typically lower than 100 nm. Both natural and synthetic graphite materials typically have a wide variety of functional groups (e.g., carbonate, hydrogen, carboxyl, lactone, phenol, carbonyl, ether, pyrone, and chromene) at the edges of crystallites defined by La and Lc. These groups can react with lithium and/or electrolyte species to form a so-called in situ CB-SEI (chemically bonded solid-electrolyte interface) on which, for example, carboxylic acid surface films are converted into Li-carboxylic salts. In other words, this SEI layer consumes a certain amount of lithium during the first few charge/discharge cycles and, hence, is a source of irreversibility as well. On a more positive note, this SEI layer can protect natural graphite by preventing solvent-induced exfoliation of natural flake graphite.

Particles of synthetic or artificial graphite, including hard carbons and soft carbons, may be prepared by graphitization of coke, or carbonization and graphitization of an organic polymeric material, petroleum pitch, coal tar pitch, and the like. The preparation of these graphite particles typically involves mechanically breaking bulk graphite chunks into smaller (millimeter- and centimeter-scaled) particles and further pulverizing these particles into micron-scaled (typically 10 to several hundreds of micron) using, for instance, air jet milling. These graphite particles are incorporated in a negative electrode (anode) for a lithium secondary battery by mixing graphite particles with an organic binder and an organic solvent to prepare a graphite paste, coating a copper foil surface with the graphite paste, and then evaporating the solvent.

However, particles of natural flake graphite or artificial graphite (or artificial carbon such as soft carbon or hard carbon) for lithium-ion anode applications have the following drawbacks:

(1) In the natural graphite particle in which graphite crystals are well grown and in the artificial graphite prepared by graphitization of coke, the inter-graphene bonding force in the crystallographic c-axis direction is van der Waals force, which is weaker than the bonding force (covalent bond) in the crystal face direction (basal plane direction). Therefore, the bonding between graphene layers is more easily broken upon pulverization to form the so-called "flake graphite", having a large aspect ratio. If flake graphite particles having a great aspect ratio are kneaded together with a binder and coated onto a current collector to form an electrode, the flaky graphite particles are oriented in the surface plane direction of the current collector, as schematically shown in FIG. 1(A). This configuration is herein defined as having a high degree of orientation. As a result, during re-charge of a battery, lithium ions coming from a separator side will have to meander around graphite particles, requiring a much longer travelling path to enter a graphite particle. During discharge, lithium ions have to exit the graphite particle and travel a longer distance as well. This high degree of orientation is not conducive to fast charge or discharge of a lithium ion battery. In contrast, as schematically shown in FIG. 1(B), lithium ions could go straight into the inter-graphene spaces of a graphite particle that has an extremely low degree of orientation. This preferred orientation enables high charge and discharge rates. Unfortunately, this configuration of extremely low orientation cannot be practically achieved.

(2) Further, prior art graphite particles tend to have a large crystallite size in the face direction (having a large La). Such a larger size requires a longer period of time for insertion and release of lithium during the charge and discharge stage of a cycle, respectively. Earlier attempts to reduce La of graphite particles tend to increase the specific surface area, resulting in a high irreversibility of lithium storage capacity.

(3) Furthermore, flake graphite particles having a high length-to-thickness aspect ratio have a great specific surface area. Thus, the lithium secondary battery obtained therefrom has a large irreversible capacity in the first cycle.

(4) Additionally, flake graphite particles, if present alone in an anode, tend to be too closely packed, leaving behind very little void space to accommodate electrolyte (schematically illustrated in FIG. 1(C)-1(E)). FIG. 1(D) serves to illustrate that there are four side or edge planes (surfaces) per graphite flake or plate. As shown in FIG. 1(E), two edge or side surfaces are lost (closed) if two graphite plates or flakes are packed side by side, leaving behind little or no void to accommodate electrolyte. Graphite particles in the electrolyte-deficient zones are useless since no lithium ions could reach the inter-graphene spaces in a graphite particle.

(5) In addition, prior art flake graphite particles often present anode preparation challenges (e.g., poor processing characteristics, including difficulty in coating a thin layer of anode paste on the current collector). They also show poor bonding characteristics to a current collector so that a large quantity of binder is needed. If the adhesiveness to the current collector is not good, the current-collecting effectiveness is compromised, and the discharge capacity, rapid charge-discharge characteristics and cycle characteristics tend to be relatively poor.

Prior attempts to overcome some of these issues have not been totally successful and, in some cases, have compromised other desirable characteristics of a graphite-carbon material, e.g. processibility, tap density, real density, and specific capacity of the anode. For instance, Y. Ishii, et al, in a series of divisional patents [U.S. Pat. No. 6,344,296, Feb. 5, 2002; U.S. Pat. No. 6,444,365, Sep. 3, 2002; U.S. Pat. No. 6,447,956, Sep. 10, 2002; U.S. Pat. No. 6,953,640, Oct. 11, 2005; and U.S. Pat. No. 7,410,727, Aug. 12, 2008], disclosed a porous graphite particulate that is formed of a plurality of flat-shaped particles assembled or bound together so that the planes of orientation are not parallel to one another, wherein, individually, the flat-shaped particles have a size of 1-100 μm in terms of mean particle diameter. This class of graphite particulates as disclosed by Ishii, et al has several major drawbacks:

(1) According to the very first sentence of the abstract of each and every one of the above patents of Ishii, et al, they disclose "a graphite particle obtained by assembling or binding together a plurality of flat-shaped particles so that the planes of orientation are not parallel to one another." Since the starting materials (graphite flakes and graphitizable materials) are all flat-shaped to begin with, they really cannot be fully random in orientation when being assembled or bound together. On the contrary, the resulting particulate actually is composed of multiple flat-shaped elements which, although do not have exactly the same orientation, tend to be preferentially aligned with respect to one another along the flat shape plane direction. This is clearly shown in their SEM micrographs. Hence, it was no surprise to see that the specific capacity and cycling behavior of these particulates presented by Ishii et al were not very impressive.

(2) The graphite particulates described above necessarily require a production process that is tedious and energy-intensive, requiring exposing the material to an ultra-high graphitization temperature (typically 2,800° C. or above) for an extended period of time (hours and often days). The process involves mixing together a graphitizable aggregate (raw material), graphite, a graphitizable binder, and 1 to 50% by weight of a graphitizing catalyst, followed by calcinations (2,800° C.) for a long time, and then mechanical chopping and air jet mill pulverization of the resulting mixture.

(3) The resulting graphite particulates are typically irregular in shape, which makes the anode preparation difficult. The irregular particulate shape also led to a relatively low tap density in the resulting anode (the amount of lithium-storing graphite material per anode volume being low). Furthermore, the necessarily and naturally formed pores in these particulates also result in a further lower tap density.

(4) In addition, the resulting particulates tend to be substantially flat-shaped as well since their constituent particles are flat-shaped. These characteristics have made it difficult or impossible for this class of graphite material to achieve a high-rate capability. Even in the low charge-discharge rate situations (e.g. Table 1 and Table 2 of U.S. Pat. No. 7,410,727), the specific capacity of most of the graphite particulates is relatively low (294-335 mAh/g). The best specific capacity (353 mAh/g) was achieved with only one out of 29 examples provided by Ishii, et al. When the discharge rate becomes higher, the discharge capacity becomes increasingly lower, e.g., rapidly decreasing from 335 mAh/g at a discharge rate of 0.3 mA/cm$^2$ to 280 mAh/g at a rate of 6.0 mA/cm$^2$ (Table 2 of U.S. Pat. No. 7,410,727).

(5) Due to the low tap density (anode packing density, g/cm$^3$, a measure of the ability to pack more anode active material in a given anode volume) and low specific capacity (mAh/g), the resulting volumetric capacity density (mAh/cm$^3$) of the anode is excessively low.

(6) Likely due to the aforementioned five serious drawbacks, the quality of the anodes prepared from this class of graphite material has been known to be inconsistent. The quality, to a great extent, depends upon the anode processing conditions and the skill level of an operator that prepares the anode.

Thus, it is desired to develop a graphite or combined graphite-carbon particulate wherein the graphite crystallite orientation is well-controlled in such a manner that the average degree of orientation remains consistent, independent of the anode processing conditions and independent of the skill level of the operator who prepares the anode.

It is desired to have particulates of graphite or combined graphite-carbon materials that, when used as an anode active material of a lithium ion battery, exhibit excellent charge-discharge characteristics at both low and high charge/discharge rates.

It is further desired to have particulates of graphite or combined graphite-carbon materials that, when used as an anode active material of a lithium ion battery, exhibit a high reversible specific capacity and a stable cycling behavior with little capacity decay for a large number of charge-discharge cycles.

This invention provides a graphite or combined graphite-carbon particulate material that exhibits the aforementioned desired characteristics.

SUMMARY OF THE INVENTION

The present invention provides a graphite or combined graphite-carbon particulate for use as a lithium secondary battery anode material having a high-rate capability, exhibiting a high specific capacity at both low and high charge-discharge rates. The particulate is formed of an orientation-controlling core particle of a carbon or graphite material and a plurality of satellite carbon or graphite particles that are each separately bonded to the core particle wherein the core particle is either spherical in shape or slightly elongate in shape (e.g. ellipsoidal) with a major axis-to-minor axis ratio preferably less than 2 and wherein the satellite particles are flat-shaped (disc-, platelet-, or flake-like), each containing a graphite crystallite with a crystallographic c-axis dimension Lc and an a-axis dimension La. Preferably, Lc is less than 100 nm and La is less than 200 nm. Preferably, the lateral dimension of the satellite particle in the a-axis direction or platelet plane direction of the satellite is less than 1 µm. The core particle may be selected from natural graphite, artificial graphite, spherical graphite, graphitic coke, meso-carbon micro-bead, soft carbon, hard carbon, graphitic fibril, carbon nano-fiber, carbon fiber, or graphite fiber. Preferably, the flat-shaped particles are randomly oriented with respect to one another.

In one preferred embodiment, the core particle is a graphitic fibril obtained by splitting a micron-diameter carbon or graphite fiber (typically 6-12 µm in diameter initially before being split) wherein the fibril has a diameter or thickness less than 5 µm, preferably between 500 nm and 5 µm, and more preferably between 1 µm and 5 µm (referred to as the lower-micron graphitic fibril). In another preferred embodiment, the core particle is a graphitic fibril obtained by carbonizing and graphitizing an electron-spun polymer, organic, or pitch fiber.

The orientation-controlling core particle may be a spherical or spheroidal graphite particle that is obtained by subjecting natural or artificial graphite particles to a shape modification treatment, such as air milling, rotational impact milling, or impact-rod milling. The core particle may be a meso-carbon micro-bead (MCMB), which is well-known in the art of anode materials for lithium ion batteries in electric vehicles (EVs). MCMBs are known to be high-rate capable and, hence, are particularly suitable for power tools and EV batteries where high charge or discharge rates are desired or required. However, MCMBs by themselves offer a relatively low specific capacity (typically 280-320 mAh/g). The presently invented particulates are far superior to MCMBs in terms of specific capacity.

Alternatively, the core particle may be a carbon or graphite particle obtained by hydrothermal synthesis. This process typically entails obtaining a solution of a renewable material (e.g., sugar) dissolved in an environmentally benign solvent (e.g., water) and subjecting this solution to an elevated pressure (e.g., 2-10 atm) and a higher-than-ambient temperature (e.g., 170-300° C.). Under these suitable temperature and pressure conditions, the sugar solution in a sealed high-pressure reactor can be converted into spherical carbon particles having a diameter typically in the range of 1-5 µm. These hydrothermally synthesized particles may be further carbonized and graphitized.

The satellite carbon or graphite particle may be selected from micron graphite, expanded graphite, nano graphene platelet, artificial graphite flake, natural graphite flake, highly oriented pyrolytic graphite (HOPG), graphitic coke, graphitized polymeric carbon, graphitized meso-phase pitch, graphite oxide, or graphite fluoride.

Both expanded graphite particles (with a thickness >100 nm) and nano graphene platelets (with a thickness ≤100 nm) may be obtained from the following procedures: For instance, natural flake graphite may be subjected to a chemical intercalation or oxidation treatment under a condition comparable to what has been commonly employed to prepare the so-called expandable graphite or stable graphite intercalation compound (GIC). This can be accomplished, for instance, by immersing graphite powder in a solution of sulfuric acid, nitric acid, and potassium permanganate for preferably 2-24 hours (details to be described later). The resulting acid-intercalated graphite compound is then subjected to washing and rinsing to remove the excess acids or oxidizing agents. The subsequently dried product is an oxidized graphite powder, hereinafter referred to as graphite oxide (GO), which comprises carbon and oxygen (at a C/O weight ratio of typically 2.0/1.0 to 2.9/1.0). The GIC or GO particles may be subjected to a thermal exfoliation treatment, typically at a temperature of 150° C.-1,100° C. for the production of exfoliated graphite or graphite worms. The exfoliated graphite worms may then be subjected to a mechanical break-up treatment (e.g. high shearing, ball milling, air milling, air jet milling, and ultrasonication) to obtain either expanded graphite particles or nano graphene platelets (NGPs).

If the degree of intercalation or oxidation is relatively low and/or exfoliation temperature is relatively low (e.g., 150° C.-600° C.) and/or the mechanical shearing intensity is relatively low, the resulting graphite flakes are typically greater than 100 nm in thickness (herein referred to as expanded graphite). Otherwise, the flakes are typically lower than 100 nm in thickness, which are herein referred to as nano graphene platelets (NGPs). For use as a satellite particle in the presently invented graphite-carbon particulate, expanded graphite particles are preferred over NGPs. Preferably, the expanded graphite particle has a thickness less than 5 µm, more preferably between 0.5 µm and 5 µm. In some cases, the satellite carbon or graphite particle may be an expanded graphite particle with a thickness less than 0.5 µm, or even a NGP with a thickness less than 100 nm.

Preferably, the satellite carbon or graphite particles have a lateral dimension (in the crystallographic a direction) less than 5 µm, more preferably less than 1 µm. A reduced lateral dimension of the graphite crystallite means a shorter diffusion distance that lithium ions or atoms have to travel in the inter-graphene space. This is essential to meeting the high-rate capability requirement. Preferably, the satellite carbon or graphite particles have a Lc dimension less than 100 nm, more preferably less than 80 nm. We were surprised to observe that, given comparable conditions, a thinner crystallite seems to be capable of accepting or releasing lithium ions at faster rates. The reason for this phenomenon remains unclear.

The satellite particles may be bonded to the core particle using an amorphous carbon, a polymeric carbon, a pitch, a conductive organic or polymer, or a combination thereof. The satellite particles are preferably bonded to the core particle using an electrically conductive binder material. Specifically, the electrically conductive binder material may be selected from coal tar pitch, petroleum pitch, meso-phase pitch, coke, a conjugate chain polymer, or an amorphous carbon obtained from chemical vapor deposition or pyrolyzation of an organic precursor.

The relative orientations of satellite particles with respect to one another are the most critical parameter in designing the presently invented graphite or graphite-carbon particulate. One of the most advantageous and surprising elements of the present invention is the notion that the presence of a core particle enables the satellite particles to be randomly oriented with respect to one another. This is why the core particle is referred to as an orientation-controlling particle. Hence, one preferred embodiment of the present invention is a core-satellite graphite or graphite-carbon particulate wherein the satellite particles are randomly oriented with respect to one another.

During the course of our investigation of the effect of graphite crystallite orientation on the anode performance, we came to surprisingly observe a very crucial parameter or index that could be utilized to define a degree of orientation of the particulate and that the index correlates well with the high-rate capability of a lithium cell featuring the presently invented particulates as an anode active material. Specifically, the degree of orientation may be defined as the ratio $I(110)/I(004)$, wherein $I(110)$ is the X-ray diffraction peak intensity of (110) planes and $I(004)$ is the X-ray diffraction peak intensity of (004) planes of a graphite crystal. Based on this definition, one preferred embodiment of the present invention is a graphite or graphite-carbon particulate that exhibits an $I(110)/I(004)$ ratio greater than 0.2, preferably greater than 0.5.

Our study also led to the discovery that it is advantageous to have a graphite or graphite-carbon particulate wherein at least the core particle or a satellite particle has a graphite crystal structure having an inter-planar spacing $d_{002}$ of at least 0.336 nm derived from a (002) reflection peak in powder X-ray diffraction.

The graphite or combined graphite-carbon particulate of the present invention provides a tap density greater than 1 $g/cm^3$, and more typically greater than 1.2 $g/cm^3$.

Due to the above-described characteristics, the presently invented graphite or combined graphite-carbon particulate provides a lithium storage specific capacity of typically at least 350 mAh/g, more typically at least 355 mAh/g. For those of graphite or combined graphite-carbon particulates that provide a lithium storage specific capacity of at least 330 mAh/g, the capacity decreases by less than 15% (more typically less than 10%) when the charge or discharge rate is increased by 20 times. Even when the initial reversible capacity is as high as at least 355 mAh/g, the capacity decreases by less than 15% when the charge or discharge rate is increased by 20 fold.

The present invention also provides a lithium ion battery negative electrode comprising a graphite or combined graphite-carbon particulate as described above and a lithium ion battery containing such a negative electrode or anode.

The core graphite or carbon particle may be obtained from particles or flakes of natural graphite, synthetic graphite or highly oriented pyrolytic graphite that is submitted to a shape modification treatment, a process that is referred to as "spheroidizing." The core particle may also be selected from a graphite fiber, carbon fiber, carbon nano-fiber, graphitic nano-fiber, spherical graphite or graphite globule, meso-phase micro-bead (MCMB), meso-phase pitch, graphitic coke, or polymeric carbon. Meso-phase pitch, graphitic coke, or polymeric carbon may optionally undergo or require additional graphitization treatment, typically at a temperature in the range of 1,500 and 3,000° C.

The satellite carbon or graphite particles may be bonded to the core particle by using an electrically conductive material, such as amorphous carbon or polymeric carbon. The amorphous carbon may be obtained from chemical vapor deposition, chemical vapor infiltration, or pyrolyzation of an organic precursor. The electrically conductive binder material may be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline).

DETAILED DESCRIPTION OF PREFERRED EMBODIMENTS

Carbon or graphite materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the crystallographic c-axis direction, the direction perpendicular to the basal plane. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a graphite particle, which can be a graphite flake, carbon/graphite fiber segment, carbon/graphite whisker, or carbon/graphite nano-fiber.

Particles of natural flake graphite or artificial graphite (or artificial carbon such as soft carbon or hard carbon) commonly used for lithium-ion anode applications have some serious drawbacks. For instance, in a natural graphite particle in which graphite crystals are well grown and in an artificial graphite prepared by graphitization of coke, the inter-graphene bonding force in the crystallographic c-axis direction is van der Waals force, which is weaker than the covalent bond in the crystal face direction (basal plane direction). Therefore, the bonding between graphene layers is more easily broken when graphite chunks or large particles are pulverized to form smaller particles (typically 5-200 μm, but more preferably 5-25 μm) for use in an anode. The pulverized product is commonly referred to as "flake graphite", which typically has a very large length-to-thickness aspect ratio (essentially in a disc or platelet shape).

Figure 1A:
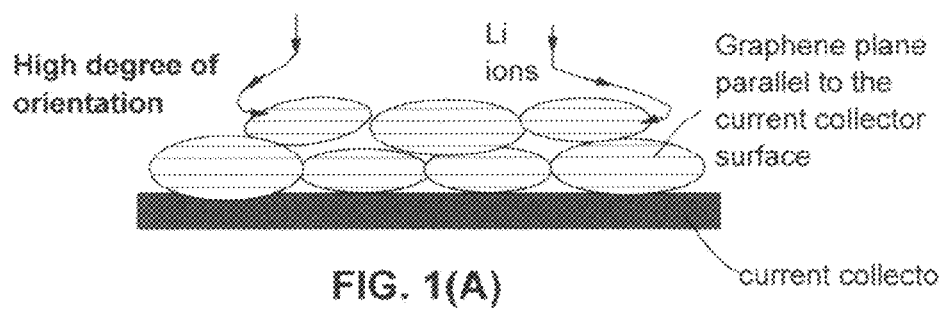
FIG. 1 Schematic of several anode configurations in a lithium ion battery: (A) a configuration with a high degree of orientation where graphite crystallites have their constituent graphene planes being substantially parallel to the current collector surface (i.e., parallel to the copper foil plane) and (B) perpendicular to the current collector surface (low degree of orientation); (C) showing a closely packed configuration of flake-like graphite particles wherein many pores are not accessible to electrolyte and many graphite flakes are not properly oriented to have their side or edge surfaces exposed to lithium ions in electrolyte; (D) indicating there are four side/edge surfaces through which lithium ions can enter into the inter-graphene spaces; and (E) indicating that two edge surfaces are lost if two graphite platelets or flakes are packed side by side.
Figure 1B:
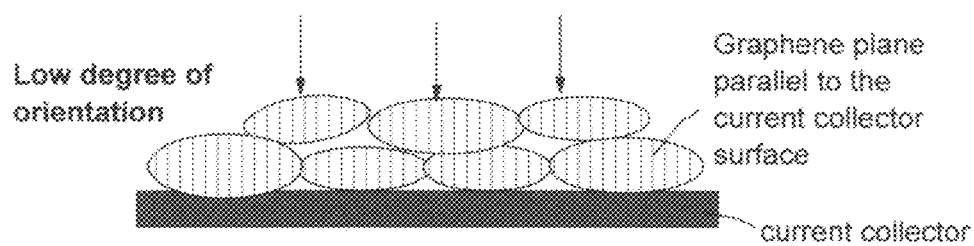

When flake graphite particles having a large aspect ratio are mixed together with a binder (typically along with a solvent) and coated onto a current collector to form an electrode, the flaky graphite particles are oriented in the surface plane direction of the current collector, as schematically illustrated in FIG. 1(A). This configuration is herein defined as having a high degree of orientation. As a result, during re-charge of a battery, lithium ions coming from a separator side will have to meander around graphite particles, requiring a much longer travelling path to enter a graphite particle. During discharge, lithium ions have to exit the graphite particle and travel a longer distance as well to move toward the cathode. Clearly, this high degree of orientation is not conducive to fast charge or discharge of a lithium ion battery. In contrast, as schematically shown in FIG. 1(B), lithium ions could go straight into the inter-graphene spaces of a graphite particle that has a low degree of orientation. This preferred orientation enables high charge and discharge rates. However, in real practice, this configuration of a low degree of orientation is difficult, if not impossible, to achieve with conventional flake graphite particles, either natural or artificial.

Figure 1C:
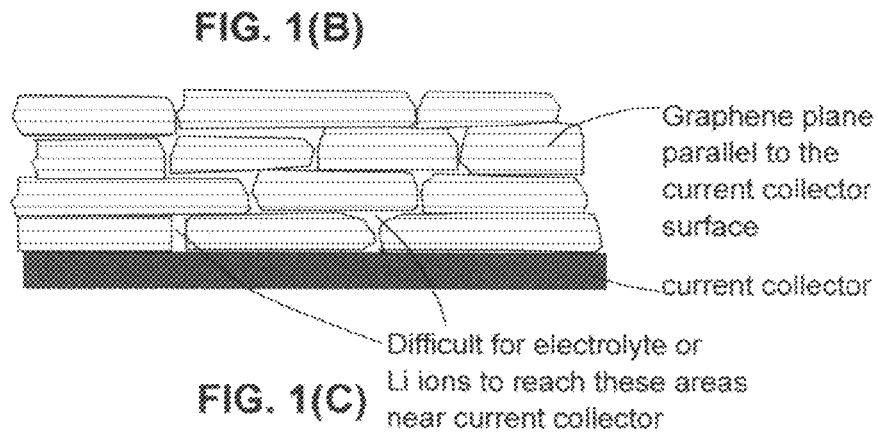

Another problem associated with the flake graphite particles having a large length-to-thickness aspect ratio is the tendency for these flakes to be closely packed to the extent that it is difficult for the electrolyte to reach the areas near the anode current collector, as schematically illustrated in FIG. 1(C). Even if some electrolyte somehow permeates to these limited access areas, it would be difficult for lithium ions coming back from the cathode during re-charge to readily enter the inter-graphene spaces in the graphite flakes near the current collector. Such a situation is not conducive to attaining a high capacity under high charge-discharge rate conditions.

Figure 1D:
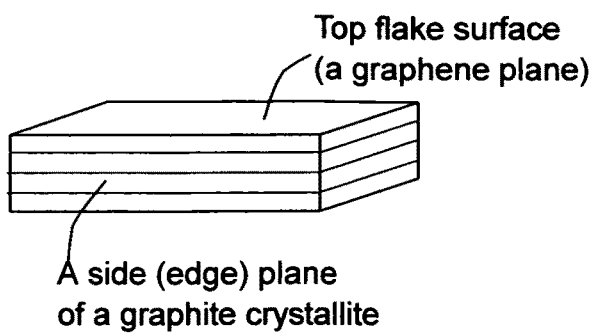
Figure 1E:
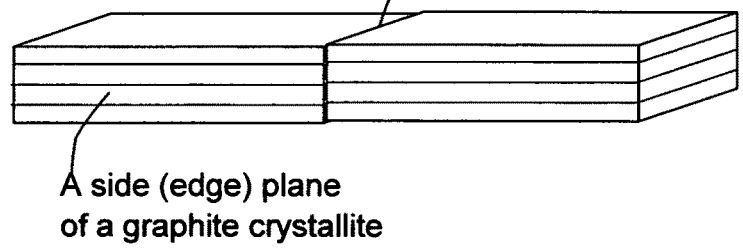

Furthermore, as illustrated in FIG. 1(D), there are four side or edge planes (surfaces) per graphite flake or plate. FIG. 1(E) shows that two edge or side surfaces are lost (closed) if two graphite plates or flakes are packed side by side, leaving behind little or no void to accommodate electrolyte. If more graphite flakes are packed together, more side surfaces will be lost, resulting in fewer or smaller voids per unit anode volume. Graphite particles in the electrolyte-deficient zones are useless since no lithium ions could reach the inter-graphene spaces in a graphite particle.

Figure 2A:
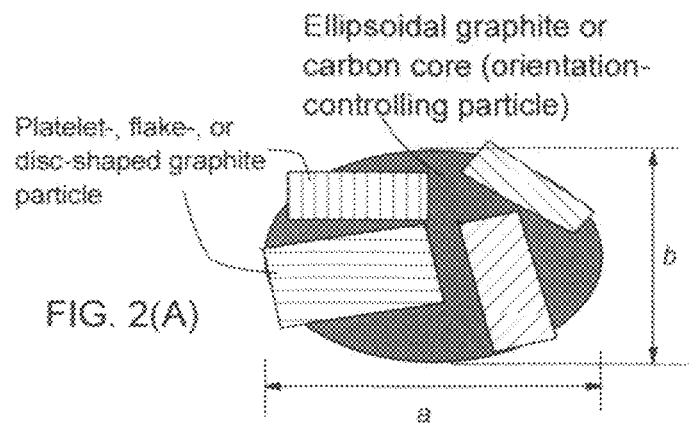
FIG. 2 Three types of graphite or graphite-carbon particulates of the present inventions: (A) core particle being an elongate or ellipsoidal shape with a major axis a and minor axis b (preferably a/b ratio <2); (B) spherical core particle; and (C) graphitic fibril or fiber core particle; (D) the presently invented core-satellite particulates provide a high tap density (hence, more anode active materials can be packed into an anode, providing a higher lithium storage capacity).
Figure 2B:
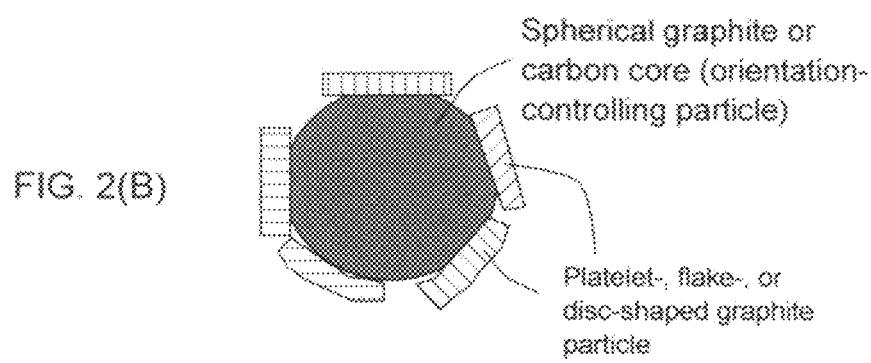
Figure 2C:
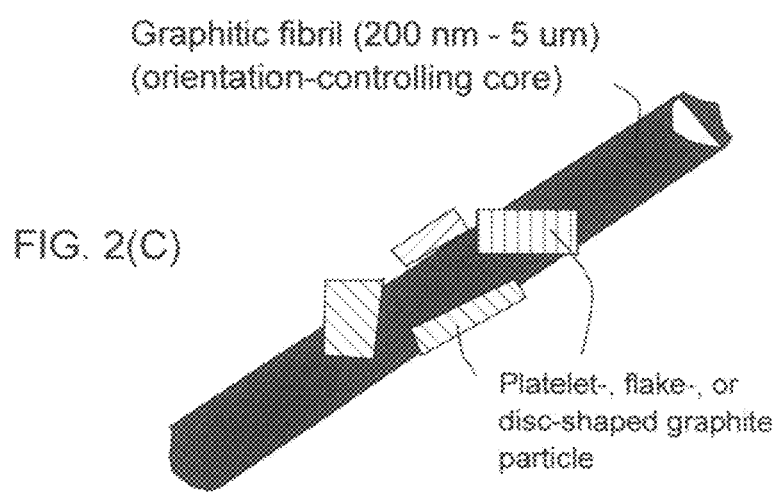

After a diligent research and development effort, the applicants have solved these challenging problems associated with flake graphite or carbon particles. Our solution includes provision of a graphite or graphite-carbon particulate that is formed of an orientation-controlling core particle of graphite or carbon and multiple satellite particles of carbon or graphite bonded or attached to (or integral with) the core particle at different spots on the external surface of the core particle. These satellite particles are flake graphite particles (disc-, platelet-, or flake-shaped) with their length or width dimension being typically and preferentially tangential relative to the perimeter of the core particles. The core particle is preferably a slightly elongate or ellipsoidal (FIG. 2(A)), spherical (FIG. 2(B)), and fibril shape (FIG. 2(C)). The elongate or ellipsoidal shape has a largest axis a (major axis) and a smallest axis b (minor axis). Preferably, the a/b ratio is less than 2. Although not preferred, the a/b ratio can be somewhat greater than 2.

A major advantage of such a particulate is the notion that the satellite flat-shaped particles are substantially randomly oriented with respect to one another. Such a random orientation is achieved in a controlled manner when the particulate is made, and remains in such a configuration of controlled orientation throughout the subsequent anode preparation and battery fabrication procedures. Such a configuration is consistently retained when the particulates are made into an anode, independent of the skill level of the operator, the equipment used to make the anode, or the anode processing conditions.

Figure 2D:
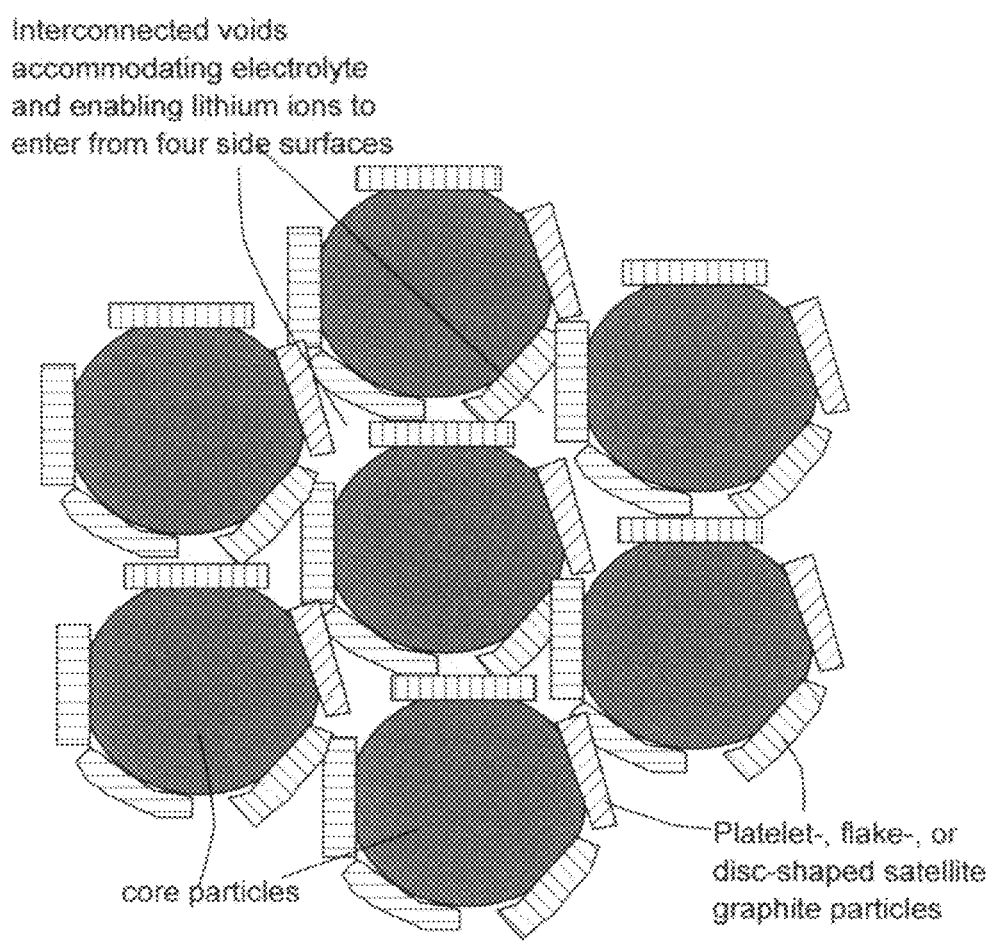

Another major advantage of this invention is the notion that, surprisingly, the overall shape of the resulting particulate is more or less spherical in shape if the core particle is spherical or slightly elongate in shape. The overall shape of the particulate is more or less cylindrical in shape if the core particle is a fibril or fiber. As a consequence, the anode containing multiple particulates of the instant invention is characterized by having a good tap density, but not excessively tight (not to restrict electrolyte access). The overall spherical or cylindrical particulate shapes are further advantageous in terms of enabling the formation of more or less interconnected pores in the anode structure, allowing electrolyte to readily permeate and wet essentially all four side surfaces of each of the satellite particles of carbon or graphite in the anode (FIG. 2(D)). No matter how the particulates are packed together, all the carbon or graphite particles are readily accessible to electrolyte from some favorable directions. Such a situation facilitates fast lithium migration in and out of graphite-carbon particles and enables high rate capability of the lithium ion batteries.

Figure 3:
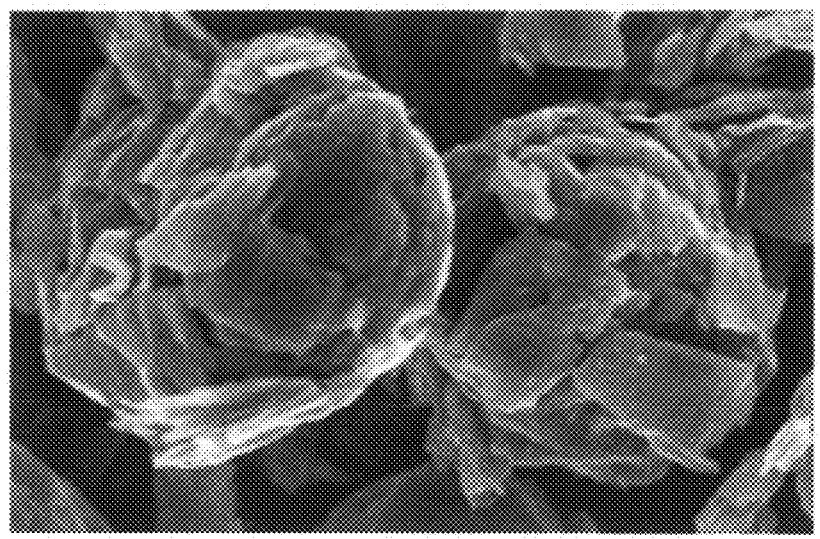
FIG. 3 An SEM image of some core-satellite particulates of the present invention.

FIG. 3 provides one example of the presently invented graphite particulates. A plurality of thin satellite graphite flakes are bonded to a core graphite particle. Although the core particles are ellipsoidal in shape (potato-shaped), the resulting particulates are spherical in shape. Since the core particles are not fully covered by satellite particles, lithium ions are capable of entering and leaving the core particles through numerous points of entry. The orientations of these satellite are essentially random with respect to one another.

A further advantageous feature of the presently invented particulates with controlled orientation is the ease with which these particulates can be made consistently and at low cost. In a typical procedure, the process begins with mixing a selected proportion of core particles (typically 5%-95% by weight, more typically 20%-80% by weight, and most typically 30%-70% by weight based on the total weight of the core and satellite particles combined), satellite particles, and a binder material. The carbon or graphite core material typically has a dimension of 1-50 μm (more preferably 5-25 μm). The type of binder is not limiting, but is preferably a conductive material (e.g. conductive polymer) or a material that can become conducting upon heat treatment (e.g. carbonization of a high carbon-yield polymer). For instance, the binder may be phenolic resin, coal tar pitch, petroleum pitch, or any other high carbon yield organic material. The mixture of core particles, satellite particles, and binder may be further diluted or dispersed in a liquid medium (e.g. a solvent for the binder). The resulting suspension or slurry is then dried, using any suitable drying means and carbonized (if pitch or phenolic resin is used as a binder, for instance). Optionally, the dried and carbonized material is further processed by crushing, filtration, and/or classification to obtain the final particulate products. Typically, no energy-intensive graphitization is needed and no expensive processing equipment is required.

Thus, in summary, the present invention provides a graphite or combined graphite-carbon particulate for use as a lithium secondary battery anode material having a high-rate capability, exhibiting a high specific capacity at both low and high charge-discharge rates. The particulate is formed of a core carbon or graphite particle and a plurality of satellite carbon or graphite particles that are each separately bonded to the core particle wherein the core particle is either spherical in shape or slightly elongate in shape (e.g. ellipsoidal) with a major axis-to-minor axis ratio preferably less than 2 and wherein the satellite particles are flat-shaped (disc-, platelet-, or flake-like), each containing a graphite crystallite with a crystallographic c-axis dimension Lc and an a-axis lateral dimension La. The core particle plays the critical role of controlling the orientation of satellite particles.

The orientation-controlling core particle may be selected from natural graphite, artificial graphite, spherical graphite, graphitic coke, meso-carbon micro-bead (MCMB), soft carbon, hard carbon, graphitic fibril, carbon nano-fiber, carbon fiber, or graphite fiber. The natural graphite or artificial graphite flake may be subjected to a shape modification treatment, using a rotational impact blending machine, an air milling system, or an impact-rod milling machine, to obtain nearly spherical or ellipsoidal shapes. MCMBs typically are highly spherical in shape and, hence, require no additional shape modification treatment. MCMBs are known to be high-rate capable and, hence, are particularly suitable for power tools and EV batteries where high charge or discharge rates are desired or required.

In one preferred embodiment, the core particle is a graphitic fibril obtained by splitting a micron-diameter carbon or graphite fiber (typically 6-12 μm) wherein the fibril has a diameter or thickness less than 5 μm, preferably between 500 nm and 5 μm, and more preferably between 1 μm and 5 μm (referred to as the lower-micron graphitic fibril). In another preferred embodiment, the core particle is a graphitic fibril obtained by carbonizing and graphitizing an electron-spun polymer, organic, or pitch fiber. Again, the electron-spun fibril has a diameter or thickness preferably between 500 nm and 5 μm, and more preferably between 1 μm and 5 μm.

Figure 4:
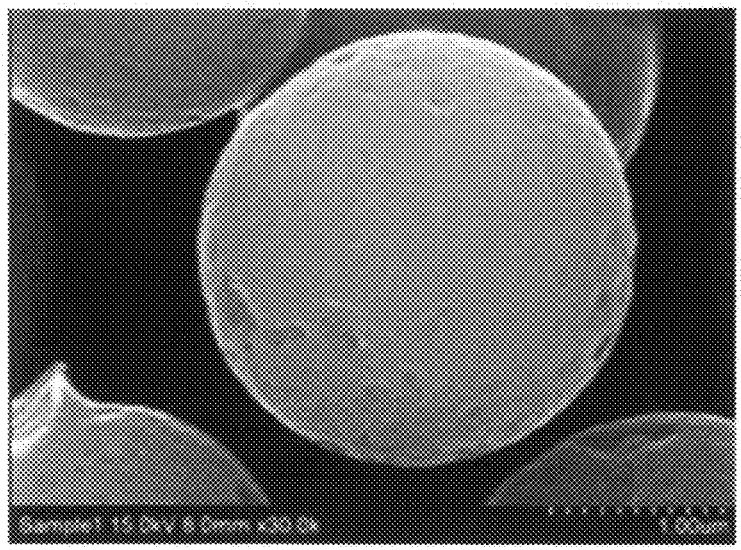
FIG. 4 Highly spherical shape of hydrothermally synthesized carbon particles.

Alternatively, the core particle may be a carbon or graphite particle obtained by hydrothermal synthesis. This process typically entails obtaining a solution of a renewable material (e.g., sugar) dissolved in an environmentally benign solvent (e.g., water) and subjecting this solution to an elevated pressure (e.g., 2-10 atm) and a higher-than-ambient temperature (e.g., 170-300° C.). Under these suitable temperature and pressure conditions, the sugar solution in a sealed high-pressure reactor can be converted into spherical carbon particles having a diameter typically in the range of 1-5 μm (FIG. 4). Optionally, these hydrothermally synthesized particles may be further carbonized and graphitized.

The satellite carbon or graphite particle may be selected from flat-shaped micron graphite, expanded graphite, nano graphene platelet, artificial graphite flake, natural graphite flake, highly oriented pyrolytic graphite (HOPG), graphitic coke, graphitized polymeric carbon, graphitized meso-phase pitch, graphite oxide, or graphite fluoride. These materials can be readily and easily pulverized into a flake-, platelet-, or disc-shape. Pulverization can be accomplished using mechanical shearing, air jet milling, impact rod milling, rotational milling, ball milling, or ultrasonication, to name a few.

Preferably, the satellite particles are expanded graphite particles (with a thickness >100 nm) or nano graphene platelets (with a thickness ≤100 nm). Both types of flake- or platelet-like graphite particles may be obtained from the following procedures: For instance, natural flake graphite may be subjected to a chemical intercalation or oxidation treatment to prepare the so-called expandable graphite, graphite intercalation compound (GIC), or graphite oxide (GO). This can be accomplished, for instance, by immersing graphite powder in a solution of sulfuric acid, nitric acid, and potassium permanganate for preferably 2-24 hours. Typically, the sulfuric-to-nitric acid ratio is 4/1 to 3/1. The resulting acid-intercalated graphite compound is then subjected to washing and rinsing to remove the excess acids or oxidizing agents. The subsequently dried product is essentially an oxidized graphite powder. The GIC or GO particles may be subjected to a thermal exfoliation treatment, typically at a temperature of 150° C.-1,100° C. for the production of exfoliated graphite or graphite worms. The exfoliated graphite worms may then be subjected to a mechanical break-up treatment (e.g. high shearing, ball milling, air milling, air jet milling, and ultrasonication) to obtain either expanded graphite particles (thickness >100 nm) or nano graphene platelets (NGPs, thickness ≤100 nm).

If the degree of intercalation or oxidation is relatively low and/or exfoliation temperature is relatively low (e.g., 150° C.-600° C.) and/or the mechanical shearing intensity is relatively low, the resulting graphite flakes are typically greater than 100 nm in thickness. This product is referred to as expanded graphite. Otherwise, the flakes are typically lower than 100 nm in thickness and these thinner flakes are herein referred to as nano graphene platelets (NGPs). For use as a satellite particle in the presently invented graphite-carbon particulate, expanded graphite particles are preferred over NGPs. Preferably, the expanded graphite particle has a thickness less than 5 μm, more preferably between 1 μm and 5 μm. In some cases, the satellite carbon or graphite particle may be an expanded graphite particle with a thickness less than 1 μm, or even a NGP with a thickness less than 100 nm. The expanded graphite particles, nano graphite platelets, or any natural graphite-derived core or satellite particle may be further coated with a thin layer of carbon. Preferably the carbon coating thickness is no greater than 100 nm.

Preferably, the satellite carbon or graphite particles have a La dimension less than 5 μm, more preferably less than 1 μm. A reduced lateral dimension of the graphite crystallite means a shorter diffusion distance that lithium ions or atoms have to travel in the inter-graphene space. This is essential to meeting the high-rate capability requirement for a lithium ion battery intended for use in a power tool or electric vehicle. Preferably, the satellite carbon or graphite particles have an Lc dimension less than 100 nm, more preferably less than 80 nm. We were surprised to observe that, given comparable conditions, a thinner crystallite seems to be capable of accepting or releasing lithium ions at faster rates. The reason for this phenomenon remains unclear.

The satellite particles are preferably bonded to the core particle using an electrically conductive binder material. Specifically, the electrically conductive binder material may be selected from coal tar pitch, petroleum pitch, meso-phase pitch, coke, a conjugate chain polymer, or an amorphous carbon obtained from chemical vapor deposition or pyrolyzation of an organic precursor.

The relative orientations of satellite particles with respect to one another are the most critical parameter in designing the presently invented graphite or graphite-carbon particulate. One of the most advantageous and surprising elements of the present invention is the notion that the presence of a core particle enables the satellite particles to be randomly oriented with respect to one another. Hence, one preferred embodiment of the present invention is a core-satellite graphite or graphite-carbon particulate wherein the satellite particles are randomly oriented with respect to one another. The core particle is surprisingly effective in controlling the orientation of the satellite particles in a controlled manner. This has not been recognized or reported in any prior work.

Figure 5:
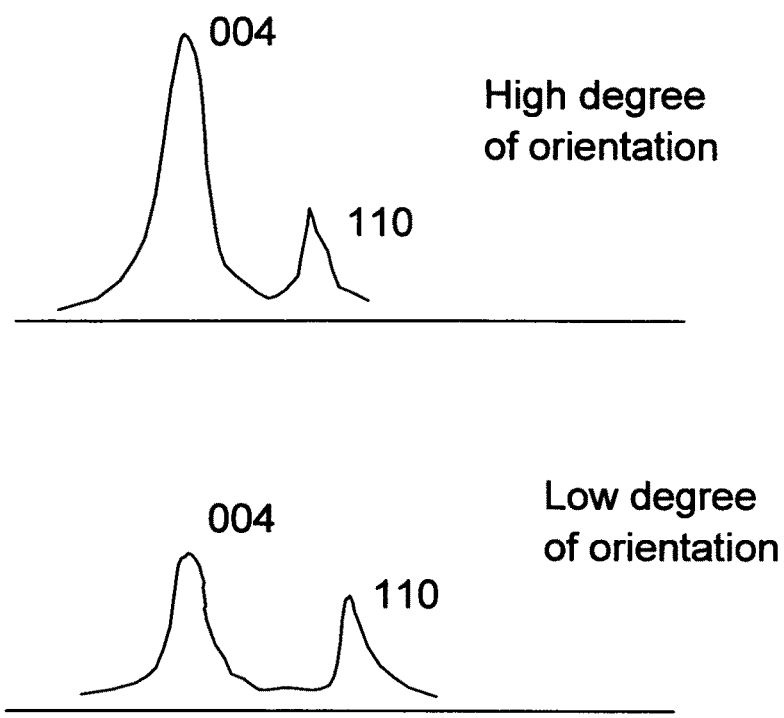
FIG. 5 The degree of orientation may be defined as the ratio $I(110)/I(004)$, wherein $I(110)$ is the X-ray diffraction peak intensity of (110) planes and $I(004)$ is the X-ray diffraction peak intensity of (004) planes of a graphite crystal.

During the course of our investigation of the effect of graphite crystallite orientation on the anode performance, we came to surprisingly observe a very crucial parameter or index that could be utilized to quantitatively define a degree of orientation of the particulate. This index correlates well with the high-rate capability of a lithium cell that contains the presently invented particulates as an anode active material. Specifically, referring to FIG. 5, the degree of orientation may be defined as the ratio I(110)/I(004), wherein I(110) is the X-ray diffraction peak intensity of (110) planes and I(004) is the X-ray diffraction peak intensity of (004) planes of a graphite crystal. Based on this definition, one preferred embodiment of the present invention is a graphite or graphite-carbon particulate that exhibits an I(110)/I(004) ratio greater than 0.2, preferably greater than 0.5. A I(110)/I(004) ratio as high as 0.77 was obtained in the present study.

Our study also led to the discovery that it is advantageous to have a graphite or graphite-carbon particulate wherein at least the core particle or a satellite particle has a graphite crystal structure having an inter-planar spacing $d_{002}$ of at least 0.336 nm derived from a (002) reflection peak in powder X-ray diffraction. Typically, artificial graphite, MCMB, soft carbon, hard carbon, graphitic coke, highly and oriented pyrolytic graphite have an inter-planar spacing slightly greater than 0.336 nm, but natural graphite has an inter-planar spacing of approximately 0.335 nm. Surprisingly, natural graphite is not as responsive as other types of graphite or carbon materials in terms of high-rate capability.

The graphite or combined graphite-carbon particulate of the present invention provides a tap density greater than 1 g/cm$^3$, and more typically greater than 1.1 g/cm$^3$, and most typically greater than 1.2 g/cm$^3$. The example given in FIG. 4 reaches a tap density of 1.34 g/cm$^3$.

The presently invented graphite or combined graphite-carbon particulates provide a lithium storage specific capacity of typically at least 350 mAh/g, more typically at least 355 mAh/g. For those of graphite or combined graphite-carbon particulates that provide a lithium storage specific capacity of at least 330 mAh/g, the capacity decreases by less than 15% (more typically less than 10%) even when the charge or discharge rate is increased by 20 times. Even when the initial reversible capacity is as high as at least 355 mAh/g, the capacity decreases by less than 15% when the charge or discharge rate is increased by 20 times. This superior high-rate capability performance has never been reported for any carbon or graphite-based anode material.

Another important index to characterize the quality of an anode active material is the tap density (packing density) of the particulates, which is a measure of the amount (weight) of anode active material that can be packed into an anode per unit volume (the design of a battery cell calls for a limited anode thickness or volume). Logically, another important index would be the volumetric capacity density (mAh/cm$^3$), which is defined as the specific capacity (mAh/g)×the tap density (g/cm$^3$). We have discovered that all our particulates provide a volumetric capacity density significantly greater than 350 mAh/cm$^3$ and mostly greater than 400 mAh/cm$^3$.

The present invention also provides a lithium ion battery negative electrode comprising a graphite or combined graphite-carbon particulate as described above and a lithium ion battery containing such a negative electrode or anode.

The satellite carbon or graphite particles may be bonded to the core particle by using an electrically conductive material, such as amorphous carbon or polymeric carbon. The amorphous carbon may be obtained from chemical vapor deposition, chemical vapor infiltration, or pyrolyzation of an organic precursor. The electrically conductive binder material may be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline).

Although both non-graphitic carbon materials or graphitic carbon materials may be employed as a core particle, graphitic materials, such as natural graphite, spheroidal natural graphite, meso-carbon microbeads, and carbon fibers (such as mesophase carbon fibers), and graphitic fibrils are preferably used. The core particle material preferably has a numerical particle size (measured by a laser scattering method) that is smaller than about 25 μm, more preferably smaller than about 15 μm, further preferably smaller than about 10 μm, and most preferably smaller than about 6 μm. The smaller particle size reduces lithium diffusion distances and increases rate capability of the anode, which is a factor in preventing lithium plating at the anode. In those instances where the particle is not spherical, the length scale parallel to the direction of lithium diffusion is the figure of merit. Larger particle sized materials may be used if the lithium diffusion coefficient is high. The diffusion coefficient of MCMB is about $10^{-10}$ cm$^2$/s. Synthetic graphite has a diffusion coefficient of about $10^{-8}$ cm$^2$/s. Hence, larger particle sizes graphite could be used if synthetic graphite is chosen.

When graphitic or graphitizable core and/or satellite particles are bonded together with a graphitizable binder material, the resulting particulate may be optionally graphitized at a temperature of 1,500-3,100° C., preferably 2,500-3,100° C. As a result of this graphitization treatment, the core particle and the satellite particles are integrated into a structure with a core portion and a plurality of satellite or perimeter portions integral with the core portion. Typically, the structure is non-porous and of high structural integrity. Preferably, the perimeter portions have a lateral dimension less than 1 μm.

Hence, another preferred embodiment of the present invention is a graphite or combined graphite-carbon particulate for use as a lithium secondary battery anode material, which is a non-porous solid particulate formed of an orientation-controlling core particle or portion of graphite or carbon and a plurality of flat-shaped satellite or perimeter portions of graphite that are integral with the core particle or portion, wherein the particulate is more or less spherical in shape, slightly elongate or ellipsoidal in shape with a major axis-to-minor axis ratio less than 2, or a fibril shape.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$) and bis-trifluoromethyl sulfonylimide lithium [LiN(CF$_3$SO$_2$)$_2$]. Among them, LiPF$_6$, LiBF$_4$ and LiN(CF$_3$SO$_2$)$_2$ are preferred. The content of aforementioned electrolytic salts in the non-aqueous solvent is preferably 0.5 to 2.0 mol/l.

EXAMPLE 1

Graphite Particulate Containing an Ellipsoidal Graphite Core and Expanded Graphite- or NGP-based Satellite Particles Ellipsoidal graphite particles were obtained from Hua-Dong Graphite Co., QingDao, China. These particles (11 μm in average size) were believed to be produced by shape modification of natural flake graphite. These particles, having a major axis-to-minor axis ratio of approximately 1.6, were used as the core particles.

Expanded graphite was used as satellite graphite particles. Expanded graphite was obtained according to the following procedure. Natural flake graphite, nominally sized at 45 μm, provided by Asbury Carbons (405 Old Main St., Asbury, N.J. 08802, USA) was milled to reduce the size to approximately 14 μm (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) or graphite intercalation compound (GIC) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 2 hours at room temperature. On completion of the reaction, the mixture was poured into 8 L of deionized water and filtered. The intercalated graphite was re-dispersed and washed in a 5% solution of HCl to remove sulphate ions. The graphite intercalation compound (GIC) was then washed repeatedly with deionized water until the pH of the filtrate was neutral. The GIC slurry was spray-dried and stored in a vacuum oven at 60° C. until use.

Sample 1B: The same procedure as in Sample 1A was followed, but the reaction time was 10 hours.

Sample 1A was exposed to a tube furnace pre-set at 550° C. for 40 seconds to obtain exfoliated graphite worms, which were subjected to a mechanical shearing treatment in a food processor type blender for 5 minutes to obtain expanded graphite flakes. The average thickness of these flakes was 274 nm.

Sample 1B was exposed to a tube furnace pre-set at 850° C. for 40 seconds to obtain exfoliated graphite worms, which were subjected to a mechanical shearing treatment in a food processor type blender for 5 minutes to obtain nano graphene platelets (NGPs). The average thickness of these NGPs was 35 nm.

In a typical graphite particulate formation process, 16 grams of spherical graphite powder was mixed with 4 grams of expanded graphite (from Sample 1A) by mechanical blending. The mixture was then mixed with 4 gram of petroleum pitch powder with rigorous stirring in a blender. The mixture was heated from room temperature to 200° C. in 10 min, maintained at 200° C. for 1 h, raised to 550° C. and maintained at 550° C. for one hour, and finally raised to 1,000° C. and maintained at 1000° C. for 1 h. The powder containing carbonized pitch- or carbon-coated particles was then filtered with a 400-mesh sieve and the resulting product was denoted as Sample SG-EP-1.

The same procedure was followed to prepare Sample SG-NGP-2 by replacing expanded graphite with NGPs prepared from Sample 1B.

In order to investigate the effect of lateral dimension (length or diameter) of a satellite particle on the high-rate capability of the resulting particulate, selected amounts of NGPs prepared from Sample 1B were further subjected to high-intensity ultrasonication, which effectively reduced the lateral dimensions of NGPs. We obtained 4 different NGP lengths with 4 different ultrasonication times: Sample SG-NGP-2-A (2.7 µm), SG-NGP-2-B (1.3 µm), SG-NGP-2-C (0.78 µm), and SG-NGP-2-DA (0.44 µm).

EXAMPLE 2

Spherical MCMBs as Core Particles

MCMBs (average diameter of 15 µm) were obtained from Shanghai Shan Shan Tech as a sample. Carbon-graphite particulates were obtained from MCMBs as core particles and the expanded graphite particles and NGPs, as obtained in Example 1, were used as satellite particles by using the same procedures described in Example 1. The resulting particulates are denoted as Sample MC-EP-3 (expanded graphite as satellite particles) and MC-NGP-4 (NGPs as satellite particles).

EXAMPLE 3

Graphitic Fibrils as Core Particles Prepared from Electrochemical Intercalation and Splitting of Carbon Fibers In a typical experiment, one gram of Amoco P-25 fibers, ground to approximately 220 µm in length, was used as the anode and 1 L of nitric acid was used as the electrolyte and intercalate source in an electrochemical intercalation system. The anode supporting element is a platinum plate and the cathode is a graphite plate of approximately 4 cm in diameter and 0.2 cm in thickness. The separator, a glass fiber fabric, was used to separate the cathode plate from the graphite/carbon fibers and to compress the fibers down against the anode supporting element to ensure that the graphite/carbon fiber segments are in electrical contact with the anode supporting element to serve as the anode in the electrochemical system (analogous to an electroplating apparatus). The electrodes, electrolyte, and separator are contained in a Buchner-type funnel to form an electrochemical intercalation cell. The anode supporting element, the cathode, and the separator are porous to permit intercalate (electrolyte) to saturate the fibers and to pass through the cell from top to bottom.

With this apparatus, the fiber segments were subjected to an electrolytic oxidation treatment at a current of 0.5 amps (current density of about 0.04 amps/cm$^2$) and at a cell voltage of about 4-6 volts for 30 minutes. These values may be varied with changes in cell configuration and makeup. Following the electrolytic treatment, the resulting intercalated fibers were washed with water and dried.

Subsequently, ⅔ of the intercalated fiber sample was transferred to a furnace pre-set at a temperature of 350° C. for 30 seconds. The intercalated fiber was found to induce rapid splitting. An ultrasonicator (operated with a power of 80 W) was used to separate the fibrils. The diameters of individual fibrils were found to range from 550 nm to 4.3 µm (with an average diameter of 2.1 µm) based on SEM observations.

Graphitic fibrils, intended for use as the orientation-controlling core particles, were mixed with expanded graphite particles of Example 1 to obtain a particulate material, Sample GF-EP-5.

EXAMPLE 4

Satellite Particles from Artificial Graphite

Artificial graphite (average size of approximately 24 µm) was subjected to an acid intercalation treatment as described in Example 1, but the chemical intercalation times were 0.5 hours and 1.5 hours, respectively. The resulting expanded graphite flakes have an average thickness of 1.8 µm and 0.54 µm, respectively. The core particles were MCMBs as used in Example 2. The particulates were obtained from the same process as in Example 2. The resulting particulates were designated as Sample MC-EPa-6 for the flake thickness of 1.8 µm.

For the sample containing expanded flakes with a flake thickness of 0.54 µm, a different binder was used. The satellite particles prepared for Sample MC-EPa-7 were bonded to the core particles with an electronically conductive polymer, polyaniline, as a binder. Polyaniline-maleicacid-dodecylhydrogensulfate salt was synthesized directly via emulsion polymerization pathway using benzoyl peroxide oxidant, sodium dodecyl sulfate surfactant, and maleic acid as dopants. Dry polyaniline powder was dissolved in DMF up to 2% w/v to form a solution. The core and satellite particles were then dispersed in this solution to form a suspension. The solvent was then vaporized to obtain the core-satellite particulates.

EXAMPLES 5-11

Evaluation of the Anode Performance in a Lithium Ion Battery

The anode active materials prepared in Examples 1-4 (7 sample series) were separately incorporated into a lithium ion battery to prepare samples for Examples 5-11, respectively. The cathode of a lithium ion battery was prepared in the following way. First of all, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 µm) serving as a current collector. The resulting two-layer aluminum foil-active material configuration was then hot-pressed to obtain a positive electrode.

The powder particulates obtained in Examples 1-4 were separately mixed with, as a binder, 2.2% by weight of styrene/butadiene rubber and 1.1% by weight of carboxylmethyl cellulose to obtain a mixture (a precursor to an anode active material), which was then coated on a copper foil to be employed as a collector. After being dried, the powder/resin mixture-copper foil configuration was hot-pressed to obtain a negative electrode (in Examples 5-11).

For comparison purposes, we also prepared anode materials from spheroidized natural graphite, MCMBs, and the artificial graphite components (according to the procedure described in Examples 1 and 12 of Ishii, et al, U.S. Pat. Nos. 6,344,296 and 7,410,727.

Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent).

In addition, button cells using the presently invented graphite or graphite-carbon particulates as one electrode and a lithium foil as a counter electrode were also fabricated and evaluated.

Figure 6A:
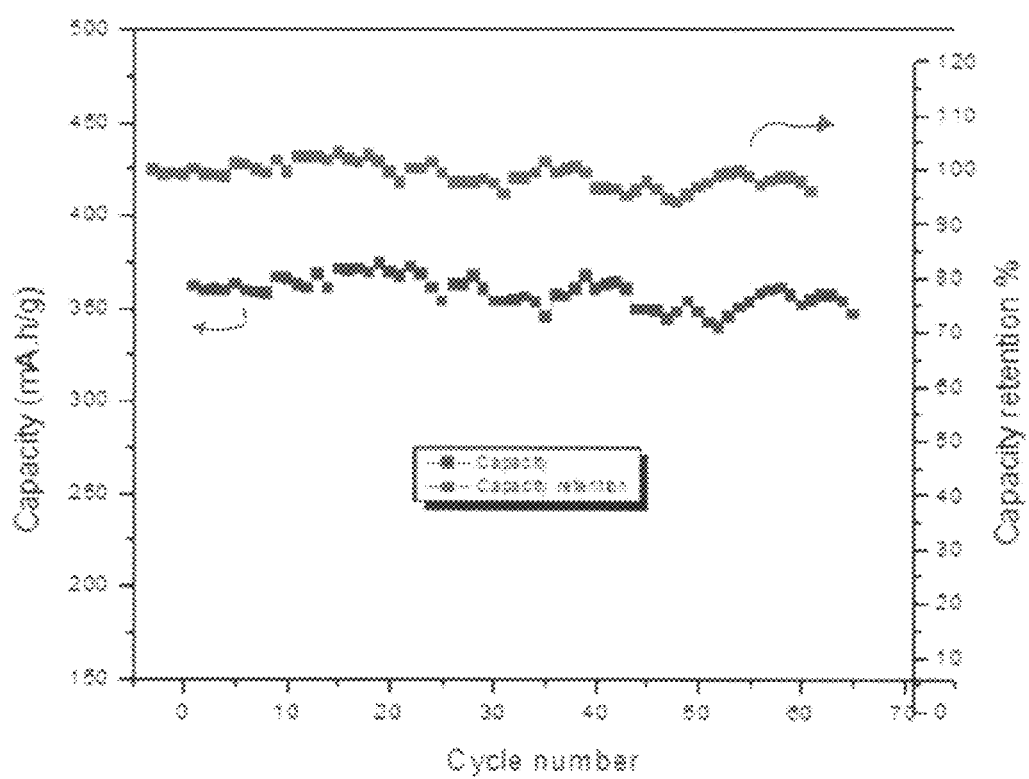
FIG. 6 (A) Half-cell and (B) full-cell testing results of a lithium-ion cell indicating the specific capacity and efficiency of Sample SG-EP-1 as a function of cycle number.
Figure 6B:
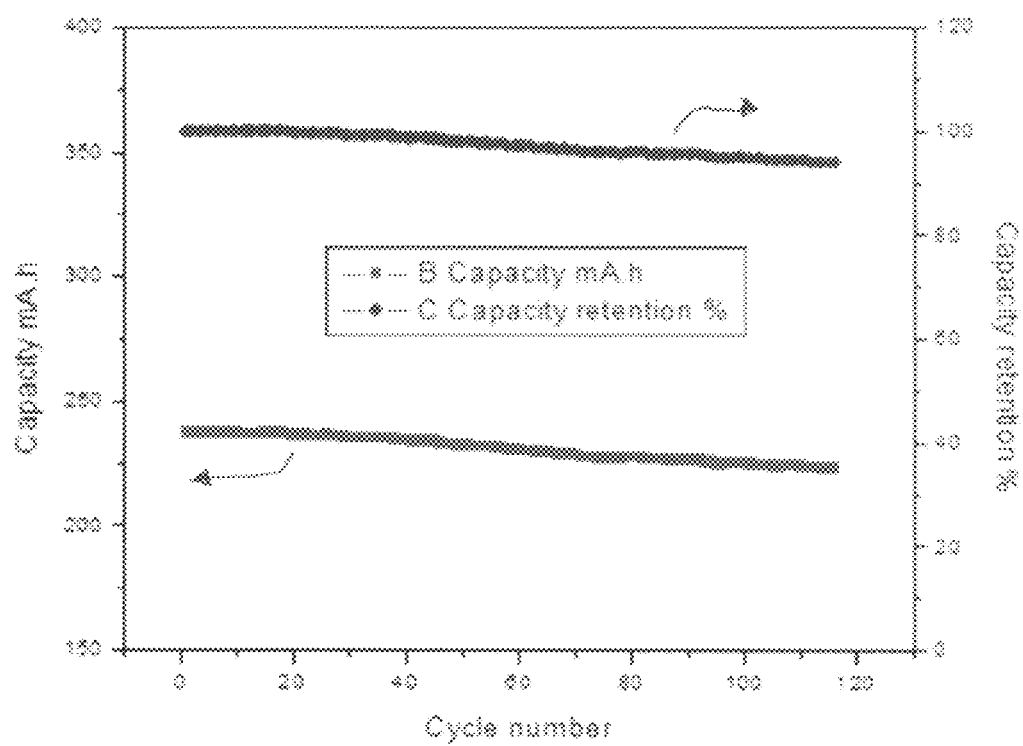

FIG. 6(A) shows the specific capacity of Sample SG-EP-1 according to the button cell or half-cell testing results. A reversible capacity as high as 350-365 mAh/g at an 1 C rate was observed. This is among the best of any previously reported data for natural graphite- or artificial graphite-based anode materials. The full-cell testing results are summarized in FIG. 6(B), which indicates that the lithium-ion cell featuring the presently invented particulate anode material retains more than 95% of its original capacity even after 120 charge/discharge cycles. This is a very surprising and impressive result.

Figure 7:
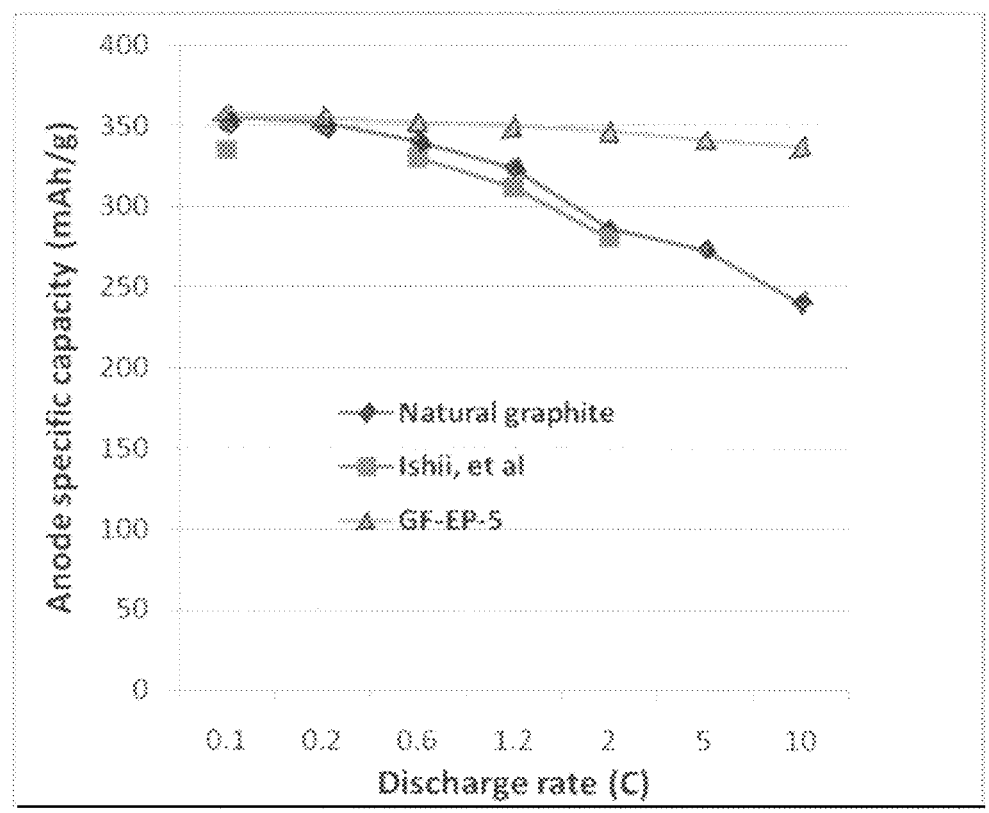
FIG. 7 Anode specific capacity of three anode active materials: our Sample GF-EP-5, Ishii et al (a state-of-the-art graphite anode material), and conventional shape-modified natural graphite.

FIG. 7 shows the specific capacity of Sample GF-EP-5 as a function of the discharge rates according to the button cell or half-cell testing results. The charge/discharge rate is typically expressed in industry in terms of a C rate, with 1 C meaning the cell being fully charged or discharged in one hour and n C meaning being fully charged or discharged in 1/n hour. Hence, a 3 C rate means complete charge or discharge in 60/3=20 minutes. FIG. 7 shows that the discharge capacity of Sample GF-EP-5 was 357 mAh/g at 0.1 C, reduced slightly to 346 mAh/g at 2 C (a reduction in capacity by only 3% when the discharge rate was increased by 20 fold) and to 337 mAh/g at 10 C (a reduction in capacity by less than 6% when the discharge rate was increased by 100 fold). This rate capability performance is unprecedented. No prior work on graphite based- or any other type of anode active material was capable of exhibiting only a 3% reduction in capacity with a 20-fold increase in discharge rate, or a less than 6% reduction in capacity when the discharge rate was increased by 100 fold.

Figure 8:
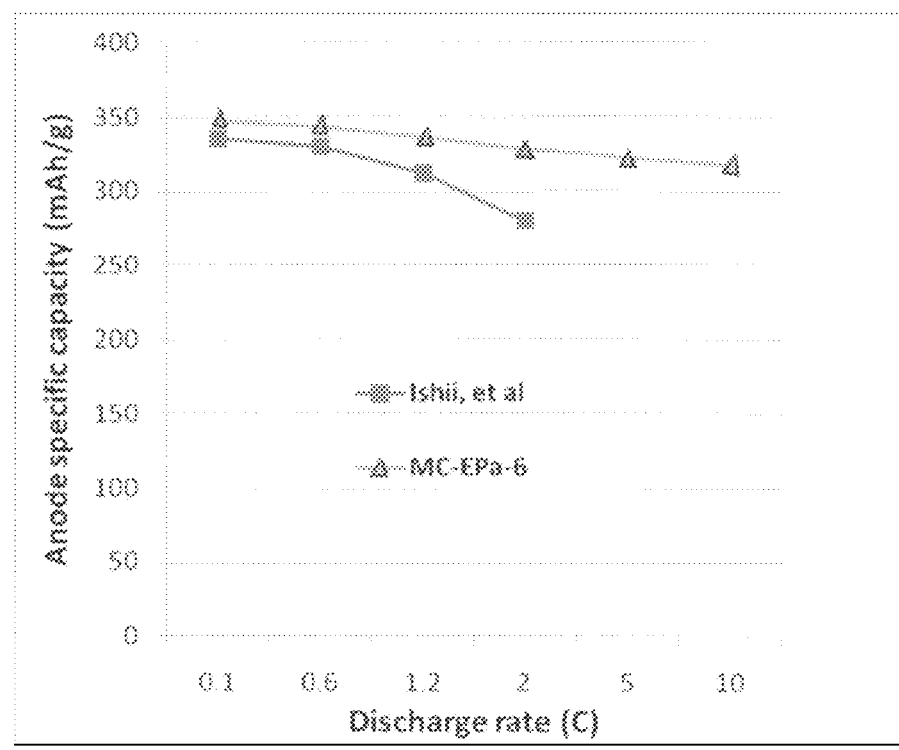
FIG. 8 Anode specific capacity of two anode active materials: our Sample MC-EPa-6 and Ishii et al (a state-of-the-art graphite anode material).

In contrast, also shown in FIG. 7, the artificial graphite-based orientation-controlled graphite particulate, as disclosed by Ishii, et al in Table 2 of U.S. Pat. No. 7,410,727 and Table 2 of U.S. Pat. No. 6,953,640 (considered the state-of-the-art graphite-based anode materials), suffer a 16% reduction in capacity when the discharge rate was increased by 20 fold. A natural graphite-based ellipsoidal particle material suffers an approximately 20% reduction in capacity when the discharge rate was increased by 20 fold. FIG. 8 provides additional evidence that has clearly demonstrated the superiority of the presently invented anode material over prior art work.

Figure 9:
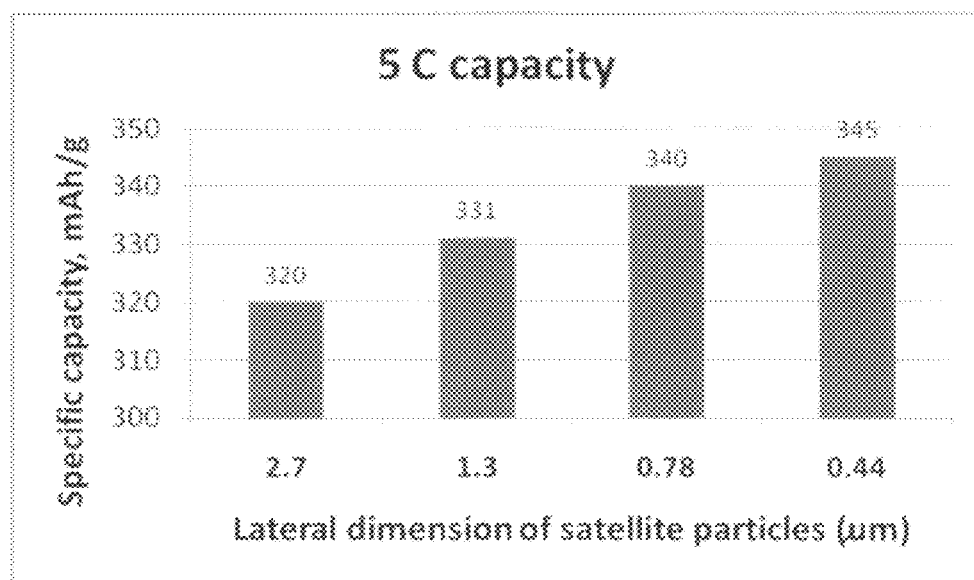
FIG. 9 The specific capacities of Sample SG-NGP-2-A (2.7 μm), SG-NGP-2-B (1.3 μm), SG-NGP-2-C (0.78 μm), and SG-NGP-2-DA (0.44 μm) obtained at a 5 C discharge rate.

The specific capacities of Sample SG-NGP-2-A (2.7 µm), SG-NGP-2-B (1.3 µm), SG-NGP-2-C (0.78 µm), and SG-NGP-2-DA (0.44 µm) obtained at a 5 C discharge rate are shown in FIG. 9. The data indicates that satellite particles with a smaller lateral dimension (length or diameter <1 µm) provide a significantly higher rate capability.

Additional performance data of select examples, summarized in Table 1 below, are very impressive indeed.

TABLE 1

The first-cycle discharge capacity (at 0.1 C) and other characteristics of the graphite or graphite-carbon particulate materials.

| Sample | Discharge Specific Capacity (mAh/g) | $d_{002}$ (nm) | I(110)/I(004) | Flake lateral dimension (µm) | Lc (nm) | Tap Density (g/cm$^3$) | Anode Volumetric Capacity (mAh/cm$^3$) |
|---|---|---|---|---|---|---|---|
| SG-EP-1 | 360-365 | 0.3356 | 0.58 | 1.2 | 103 | 1.18 | 424.8 |
| SG-NGP-2 | 355-362 | 0.3356 | 0.58 | 0.8 | 97 | 1.34 | 431.9 |
| MC-EP-3 | 352 | 0.336 | 0.67 | — | 86 | 1.25 | 440 |
| MC-NGP-4 | 348 | 0.336 | 0.65 | — | 82 | 1.27 | 441.9 |

TABLE 1-continued

The first-cycle discharge capacity (at 0.1 C) and other characteristics of the graphite or graphite-carbon particulate materials.

| Sample | Discharge Specific Capacity (mAh/g) | $d_{002}$ (nm) | I(110)/I(004) | Flake lateral dimension (μm) | Lc (nm) | Tap Density (g/cm$^3$) | Anode Volumetric Capacity (mAh/cm$^3$) |
|---|---|---|---|---|---|---|---|
| GF-EP-5 | 357 | 0.3362 | 0.65 | — | 76 | 1.17 | 417.7 |
| MC-EPa-6 | 347 | 0.3366 | 0.77 | 0.6 | 68 | 1.23 | 426.8 |
| MC-EPa-7 | 347 | 0.3366 | 0.77 | — | 68 | 1.32 | 430.3 |
| NG only | 350-360 | 0.3354 | <0.1 | >2 | >100 | 1.0-1.2 | 385 |
| MCMB only | 280-330 | 0.3364 | 0.55 | — | 82 | 1.1-1.3 | 360 |
| Ishii, et al | mostly <335 | 0.3362 | 0.32 | >>1 | 87 | 1.02 | 342 |
| Ishii, et al | 353 (their best) | | | | | 092 | 324.8 |

These data (FIG. 6-FIG. 9 and Table 1) have clearly demonstrated that the presently invented graphite or graphite-carbon particulates are superior to all state-of-the-art or prior art graphite-carbon materials for lithium-ion battery anode applications in terms of specific capacity, cycle stability, high-rate capability, and tap density.

Tap density is an indication of the amount of anode materials that can be packed into an electrode per unit volume of electrode. This is a very important index commonly used in lithium ion battery industry to evaluate the quality of an anode active material. Its importance cannot be and should not be ignored. Due to the highest specific capacity (mAh/g) of the instant non-porous particulates and its high tap density (g/cm$^3$), the volumetric lithium storage capacity density of an anode (mAh/cm$^3$ of anode volume, as summarized in the far right column of Table 1) can be significantly improved. No prior art carbon- or graphite-based anode materials even come close to the volumetric lithium storage capacity density provided by the particulates of the instant invention.

The invention claimed is:

1. A graphite or combined graphite-carbon particulate for forming a lithium secondary battery anode material, said particulate consists of an orientation-controlling core particle of carbon or graphite and a plurality of satellite carbon or graphite particles that are each separately bonded or attached to said core particle at a surface of said core particle, wherein the core particle is spherical or ellipsoidal in shape with a major axis-to-minor axis ratio less than 2, or a fibril shape having a diameter from 200 nm to 5 μm, wherein said satellite particles are flat-shaped, disc-, platelet-, or flake-like particles having a thickness less than 100 nm and a lateral dimension less than 1 μm that are selected from nano graphene platelets, graphite oxide, or graphite fluoride each consisting of a graphite crystallite having a preferred orientation defined by a crystallographic c-axis, wherein said satellite particles are single-crystal structures that are randomly oriented with respect to one another for the purpose of increasing power capability of said particulate, and wherein said satellite particles are bonded to said core particle using a conductive binder selected from an amorphous carbon, a polymeric carbon, a pitch, petroleum pitch, coal tar pitch, meso-phase pitch, coke, a conductive organic or polymer, or a combination thereof.

2. The graphite or combined graphite-carbon particulate of claim 1, wherein said core particle is selected from natural graphite, artificial graphite, spherical graphite or graphite globule, graphitic coke, meso-carbon micro-bead, soft carbon, hard carbon, graphitic fibril, carbon nano-fiber, carbon fiber, or graphite fiber.

3. The graphite or combined graphite-carbon particulate of claim 1, wherein said core particle is a graphitic fibril obtained by splitting a micron-diameter carbon or graphite fiber wherein said fibril has a diameter or thickness less than 5 μm.

4. The graphite or combined graphite-carbon particulate of claim 1, wherein said core particle is a graphitic fibril obtained by carbonizing and graphitizing an electron-spun polymer, organic, or pitch fiber.

5. The graphite or combined graphite-carbon particulate of claim 1, wherein said core particle is a spherical or spheroidal graphite.

6. The graphite or combined graphite-carbon particulate of claim 1, wherein said core particle is a meso-carbon micro-bead or a carbon or graphite particle obtained by hydrothermal synthesis.

7. The graphite or combined graphite-carbon particulate of claim 1, wherein at least one of said satellite carbon or graphite particles is an expanded graphite particle or nano graphene platelet coated with a carbon layer.

8. The graphite or combined graphite-carbon particulate of claim 1, which is a non-porous solid particulate.

9. The graphite or combined graphite-carbon particulate of claim 1, wherein at least one of said satellite carbon or graphite particles has a lateral dimension less than 1 μm.

10. The graphite or combined graphite-carbon particulate of claim 1, which provides a tap density of at least 1.1 g/cm$^3$.

11. The graphite or combined graphite-carbon particulate of claim 1, which provides a tap density of at least 1.2 g/cm$^3$.

12. The graphite or combined graphite-carbon particulate of claim 1, wherein at least one of said satellite carbon or graphite particles has a graphite crystal having a crystallographic c-axis dimension Lc less than 100 nm.

13. The graphite or combined graphite-carbon particulate of claim 1, wherein at least one of said satellite carbon or graphite particles has a graphite crystal having a crystallographic c-axis dimension Lc less than 80 nm.

14. The graphite or combined graphite-carbon particulate of claim 1, wherein at least one of said satellite particles is bonded to said core particle using an electrically conductive binder material.

15. The graphite or combined graphite-carbon particulate of claim 1, wherein at least one of said satellite particles is bonded to said core particle using an electrically conductive binder material selected from coal tar pitch, petroleum pitch, meso-phase pitch, coke, a conjugate chain polymer, or an amorphous carbon obtained from chemical vapor deposition or pyrolyzation of an organic precursor.

16. The graphite or combined graphite-carbon particulate of claim 1, wherein at least one of said satellite particles or core particle is coated with a non-graphitic carbon.

17. The graphite or combined graphite-carbon particulate of claim 1, wherein a degree of orientation as defined by the ratio I(110)/I(004) is greater than 0.2, wherein I(110) is the X-ray diffraction peak intensity of (110) planes and I(004) is the X-ray diffraction peak intensity of (004) planes of a graphite crystal.

18. The graphite or combined graphite-carbon particulate of claim 1, wherein a degree of orientation as defined by the ratio I(110)/I(004) is greater than 0.5, wherein I(110) is the X-ray diffraction peak intensity of (110) planes and I(004) is the X-ray diffraction peak intensity of (004) planes of a graphite crystal.

19. The graphite or combined graphite-carbon particulate of claim 1, wherein at least said core particle or satellite particles has a graphite crystal structure having an interplanar spacing $d_{002}$ of at least 0.336 nm derived from a (002) reflection peak in powder X-ray diffraction.

20. The graphite or combined graphite-carbon particulate of claim 1, which provides a lithium storage specific capacity of at least 350 mAh/g.

21. The graphite or combined graphite-carbon particulate of claim 1, which provides a lithium storage specific capacity of at least 355 mAh/g.

22. The graphite or combined graphite-carbon particulate of claim 1, which provides a lithium storage specific capacity of at least 330 mAh/g, which decreases by less than 15% when the charge or discharge rate is increased by 20 times.

23. The graphite or combined graphite-carbon particulate of claim 1, which provides a lithium storage specific capacity of at least 330 mAh/g, which decreases by less than 10% when the charge or discharge rate is increased by 20 times.

24. The graphite or combined graphite-carbon particulate of claim 1, which provides a lithium storage specific capacity of at least 355 mAh/g, which decreases by less than 15% when the charge or discharge rate is increased by 20 times.

25. The graphite or combined graphite-carbon particulate of claim 1, which provides an anode volumetric capacity density greater than 350 mAh/cm$^3$.

26. The graphite or combined graphite-carbon particulate of claim 1, which provides an anode volumetric capacity density greater than 400 mAh/cm$^3$.

27. A graphite or carbon paste containing a graphite or combined graphite-carbon particulate of claim 1 and a liquid medium as a precursor to an anode.

28. A lithium ion battery negative electrode comprising a graphite or combined graphite-carbon particulate of claim 1.

29. A lithium ion battery comprising a negative electrode which comprises a graphite or combined graphite-carbon particulate of claim 1.

30. A graphite or combined graphite-carbon particulate for forming a lithium secondary battery anode material, said particulate is non-porous and is formed of an orientation-controlling core particle or portion of graphite or carbon that is spherical, spheroidal, or ellipsoidal in shape, and a plurality of flat-shaped satellite or perimeter portions of graphite that are integral with said core particle or portion, wherein said satellite or perimeter portions of graphite are single-crystal structures, and wherein the particulate is spherical in shape or ellipsoidal in shape with a major axis-to-minor axis ratio less than 2, or a fibril shape having a diameter from 200 nm to 5 μm, and said flat-shaped satellite portion consists of nano graphene platelets, graphite oxide, or graphite fluoride having a preferred orientation defined by a crystallographic c-axis thereof and wherein said plurality of flat-shaped satellite or perimeter portions of graphite are randomly oriented with respect to one another for the purpose of increasing power capability of said particulate, and said flat-shaped satellite portion consists of nano graphene platelets, graphite oxide, or graphite fluoride having a thickness less than 100 nm and a lateral dimension less than 1 μm.

\* \* \* \* \*